US011898739B2

(12) United States Patent
Small

(10) Patent No.: US 11,898,739 B2
(45) Date of Patent: Feb. 13, 2024

(54) SAFETY DETECTION DEVICE AND SYSTEM

(71) Applicant: Defining Future Solutions Pty Ltd., Bundall (AU)

(72) Inventor: David Frederick Small, Ormeau (AU)

(73) Assignee: Defining Future Solutions PTY Ltd, Bundall (AU)

( * ) Notice: Subject to any disclaimer, the term of this patent is extended or adjusted under 35 U.S.C. 154(b) by 291 days.

(21) Appl. No.: 17/414,897

(22) PCT Filed: Dec. 18, 2019

(86) PCT No.: PCT/AU2019/051396
§ 371 (c)(1),
(2) Date: Jun. 16, 2021

(87) PCT Pub. No.: WO2020/124145
PCT Pub. Date: Jun. 25, 2020

(65) Prior Publication Data
US 2022/0065440 A1 Mar. 3, 2022

(30) Foreign Application Priority Data
Dec. 18, 2018 (AU) ................................ 2018904813

(51) Int. Cl.
*G08B 17/103* (2006.01)
*F21V 33/00* (2006.01)
(Continued)

(52) U.S. Cl.
CPC .......... *F21V 33/0076* (2013.01); *F21S 9/022* (2013.01); *G08B 17/103* (2013.01); *F21S 8/026* (2013.01); *F21S 8/061* (2013.01)

(58) Field of Classification Search
CPC ..... F21V 33/0076; F21S 9/022; G08B 17/103
See application file for complete search history.

(56) References Cited

U.S. PATENT DOCUMENTS 4,090,178 A * 5/1978 Norris ................ F21V 33/0076 340/630
4,167,688 A * 9/1979 Burek .................... G08C 19/30 219/508
(Continued)

FOREIGN PATENT DOCUMENTS

CN 102754136 A 10/2012
CN 206786496 U 12/2022
(Continued)

OTHER PUBLICATIONS

International Search Report in PCT/AU2019/051396, dated Mar. 16, 2020, 4 pages.
(Continued)

*Primary Examiner* — Hoi C Lau
(74) *Attorney, Agent, or Firm* — Kilpatrick Townsend & Stockton LLP

(57) ABSTRACT

Light fixtures and safety detection systems are provided that enable smoke detection devices to be installed in a manner that is out-of-sight, thus alleviating the need to unsightly smoke detection devices to be installed throughout a building. The safety detection system comprises: an electrical fixture, for installation in a building; and a smoke detection device, for detecting at least smoke in the building. The smoke detection device is integrated with the electrical fixture such that the smoke detection device is concealed when installed.

19 Claims, 12 Drawing Sheets

(51) Int. Cl.

| | |
|---|---|
| ***F21S 9/02*** | (2006.01) |
| *F21S 8/02* | (2006.01) |
| *F21S 8/06* | (2006.01) |

(56) References Cited

U.S. PATENT DOCUMENTS

| | | | | |
|---|---|---|---|---|
| 4,694,285 | A * | 9/1987 | Scripps | G08B 17/00 340/693.11 |
| 4,702,452 | A * | 10/1987 | Penar | G08B 17/113 340/693.11 |
| 4,717,910 | A * | 1/1988 | Scripps | F21V 33/0076 340/693.11 |
| 4,896,145 | A * | 1/1990 | Lewkowicz | G08B 17/00 340/693.11 |
| 4,980,672 | A * | 12/1990 | Murphy | G08B 13/1409 315/136 |
| 5,333,418 | A * | 8/1994 | Chambers | G08B 17/113 52/27 |
| 6,181,251 | B1 * | 1/2001 | Kelly | G08B 17/00 362/147 |
| 7,786,879 | B2 * | 8/2010 | Lax | G08B 17/10 340/532 |
| 7,969,321 | B2 * | 6/2011 | Spellman | G08B 17/113 340/693.11 |
| 7,990,252 | B2 * | 8/2011 | Barton | H05B 47/11 340/815.45 |
| 8,199,029 | B2 * | 6/2012 | Bell | G08B 17/10 340/945 |
| 10,310,464 | B1 * | 6/2019 | Lu | G05B 15/02 |
| 11,454,389 | B1 * | 9/2022 | Ryznic | G08B 17/113 |
| 2007/0285262 | A1 * | 12/2007 | Lax | G08B 17/10 340/628 |
| 2008/0210839 | A1 * | 9/2008 | Klapp | G08B 17/113 248/343 |
| 2008/0272922 | A1 * | 11/2008 | Spellman | F21V 33/0076 340/628 |
| 2009/0072970 | A1 * | 3/2009 | Barton | H05B 47/11 362/20 |
| 2010/0321212 | A1 * | 12/2010 | Bell | G08B 17/10 340/945 |
| 2011/0038126 | A1 * | 2/2011 | Casey | G08B 17/10 361/729 |
| 2011/0084844 | A1 * | 4/2011 | Carnation | G08B 17/10 340/693.1 |
| 2012/0268281 | A1 * | 10/2012 | Hojmose | G08B 17/113 340/630 |
| 2013/0039055 | A1 * | 2/2013 | Wilson | B60Q 3/74 362/249.02 |
| 2014/0104067 | A1 * | 4/2014 | Chien | G08B 17/10 340/628 |
| 2014/0266747 | A1 * | 9/2014 | Prendergast | G08B 21/14 362/253 |
| 2015/0048951 | A1 * | 2/2015 | Chesney | G08B 7/064 340/628 |
| 2015/0259078 | A1 * | 9/2015 | Filipovic | G05D 1/0011 244/114 R |
| 2016/0092704 | A1 * | 3/2016 | Russell | G06K 7/10425 340/10.3 |
| 2020/0271291 | A1 * | 8/2020 | Ward | F21V 21/044 |
| 2021/0325010 | A1 * | 10/2021 | Talbi | F21S 8/02 |
| 2022/0065440 | A1 * | 3/2022 | Small | G08B 5/36 |
| 2022/0351595 | A1 * | 11/2022 | Ryznic | G08B 19/00 |

FOREIGN PATENT DOCUMENTS

| | | | |
|---|---|---|---|
| WO | 1999/019666 | A1 | 4/1999 |
| WO | 2016/179655 | A1 | 11/2016 |

OTHER PUBLICATIONS

Examination report in AU 2019409992 dated Jun. 14, 2022, 4 pages.
Extended EP Search Report in EP 19899883.3 dated Aug. 5, 2022, 7 pages.
Second Examination Opinion in CN 2019800922024, 12 pages.
Examination Report in AU 2019409992, dated Nov. 1, 2022, 4 pages.
Examination Report in IN 202147031721, dated Feb. 2, 2023, 6 pages.
Notice of Reasons of Refusal in JP 2021-534995, dated Jun. 30, 2023, 4 pages.

* cited by examiner

SAFETY DETECTION DEVICE AND SYSTEM

TECHNICAL FIELD

The present invention relates to a safety detection system and device, and in particular, although not exclusively, to smoke detection devices for installation in a building.

BACKGROUND ART

Smoke detection devices are an important safety feature in residential and commercial buildings. They provide early detection of environmental parameters that indicate the presence of a fire, such as smoke particles and excessive heat.

In many jurisdictions, legislation or building regulations exist which regulate the presence, functionality, configuration and installation of smoke detection devices in buildings. Queensland legislation, for example, states that by January 2022 all houses, townhouses and apartments are required to have interconnected and 240V-powered smoke alarms in each bedroom, hallways connecting bedrooms, living rooms, and at least one smoke alarm on storeys without bedrooms.

A problem with smoke detection devices of the prior art is that they are generally unsightly, which is particularly problematic as the smoke alarms must be placed throughout a building. A further problem with smoke detection devices of the prior art is that installation thereof is generally expensive, particularly if they are connected to the building's mains power, in addition to the battery power, which is required by modern standards.

As such, there is clearly a need for an improved safety detection device and system, in particular in the context of smoke detection devices.

It will be clearly understood that, if a prior art publication is referred to herein, this reference does not constitute an admission that the publication forms part of the common general knowledge in the art in Australia or in any other country.

SUMMARY OF INVENTION

The present invention is directed to a safety detection devices and systems which may at least partially overcome at least one of the abovementioned disadvantages or provide the consumer with a useful or commercial choice.

With the foregoing in view, in a first aspect the present invention resides broadly in a safety detection system, comprising:

an electrical fixture, for installation in a building; and a smoke detection device, for detecting at least smoke in the building, the smoke detection device being integrated with the electrical fixture such that the smoke detection device is concealed when installed.

Advantageously, the system enables smoke detection devices to be installed in a manner that is out-of-sight, thus alleviating the need to unsightly smoke detection devices to be installed throughout a building. As electrical fixtures, such as light fixtures, are common throughout a building, smoke detection devices may be installed in association therewith with little to no additional labour cost.

The fixture may comprise a light fixture.

The safety detection system may include a reservoir, concealed by the electrical fixture, the reservoir including the smoke detection device.

The reservoir may include one or more apertures, to enable airflow into the reservoir. The reservoir may be positioned behind the fixture in use, and thereby concealed by the fixture. The fixture may include a plurality of apertures around a periphery of a base thereof, to enable airflow into the reservoir.

The fixture may include a faceplate, configured to conceal the reservoir. The reservoir may be fixedly attached to the faceplate.

The fixture may be configured to be installed on a ceiling in the building. The reservoir may be at least partly received in a space defined above the ceiling. The fixture may extend downwards from the ceiling.

The reservoir may, for example, be cylindrical or frustoconical in shape.

The reservoir may releasably engage with the fixture.

The system may include an electrical input, the electrical input configured to provide power to both the smoke detection device and the electrical fixture. The electrical input may be configured to provide power to a battery, which in turn powers the smoke detection device in at least one configuration.

The system may be configured to be connected to a switched electrical input, configured to enable the fixture to be turned on and off. The system may include a battery configured to power the smoke detection device when the fixture is switched off. The system may include a second electrical input to power the smoke detection device. The second electrical input may be a non-switched (i.e. permanent) input.

The electrical fixture may be configured to operate in a signalling configuration when smoke detected by the smoke detection device. In the case of a light fixture, the light may be configured to flash or illuminate in a particular hue and/or frequency to provide signalling to occupants in the building.

The system may include a second electrical fixture, configured to operate in a signalling configuration when smoke is detected by the smoke detection device. Such configuration enables multiple electrical fixtures (e.g. lights) to operate in a signalling configuration in a coordinated manner. The first and second electrical fixtures may be wirelessly coupled (e.g. by wifi or RF).

The smoke detection device may include input sensors. The input sensors may comprise a plurality of sensors each configured to sense the level of one or more environmental parameters, including smoke, carbon monoxide, temperature, infra red radiation or other detectable environmental parameters.

The detection device may include an ionisation sensor configured to detect and react to particles emitted in a fire. The detection device may include a photoelectric sensor configured to detect smoke. The detection device may include a carbon monoxide sensor configured to detect undesirable levels of carbon monoxide. The detection device may include a temperature sensor configured to detect excessive temperatures, which are indicative of a fire. The detection device may include other sensors configured to detect other environmental parameters. The detection device may include a plurality of sensors configured to detect different environmental parameters.

The input sensors may also be configured to detect the location or direction of origin of the detectable environmental parameter.

The safety detection system may include a light sensor to sense the light level within the space surrounding the device.

The detection device may include one or more status outputs to output information indicating the status of the detection device. Status information may include information pertaining to the operating status of the device. The output status information may include information pertaining to the alert status of the device, or the power status of the device, including low battery alerts, and loss of communication connectivity alerts.

Information pertaining to the operating status of the device may comprise information communicating the current state of the device, current configuration of the device, the error status of the device, the power status of the device, the communication status of the device, connectivity status of the device, status history information, sensory history information, currently detected sensor levels or other status information.

Information pertaining to the alert status of the device may include information regarding the current or past smoke status, carbon monoxide status or another detectable environmental parameter status.

The status outputs may comprise a sound emitting device (e.g. a speaker or piezoelectric buzzer), one or more lights, one or more status displays or other status outputs. The status outputs may be in communication with remote devices. The light(s) may include a light of the fixture, or a status light.

The device may communicate alert status or operating status information to the user via an illumination frequency, pattern, brightness or colour of the one or more lights. The device may communicate alert status or operating status information to the user via audible sounds, pre-recorded audible alerts, human voice instructions or other sounds emanating from the speaker.

A light may illuminate in the event of an alert situation. The alert light may provide illumination which guides a user to an exit. The light may signify the type or nature of the alert via hue or light activation sequencing (i.e. flashing patterns or sequences). The light may be a light of the fixture (i.e. a light fixture), or an alert light.

The device may be integrally formed with, fixedly attached to, or removably attached to the electrical fixture. The electrical fixture may be configured to be integrally formed with, fixedly attached to or removably attached to an interior wall, exterior wall, ceiling or other surface of a building or structure.

The electrical fixture may be a component that is installed during construction of the building or structure, and may be connected to mains power within the building or structure.

According to an embodiment of the invention, the electrical fixture may be a fan, such as a ceiling fan or an exhaust fan. The safety detection system may configure the fan to deactivate or activate in response to the device entering an alert state.

According to another embodiment of the invention, the electrical fixture may be an air conditioning unit or ventilation unit. The safety detection system may configure the air conditioning unit to deactivate, activate, or change mode of operation in response to the device entering an alert state.

According to some embodiments, the electrical fixture may be light fixture comprising an illumination component. The illumination component may comprise a light such as a globe, a downlight, a spot light or other lighting component. The illumination component may also comprise a light fitting, such as a shade, a rose, a pendant or a flush mount. The detection device may be located above the illumination component or in any suitable position to allow for effective detection of smoke or other environmental parameters indicative of a fire.

The illumination component may be a light configured to illuminate a room or a substantial portion of a room. The light fitting may be integrally formed with, fixedly attached to, or removably attached to a ceiling or wall within a room. The light fitting may be integrally formed with, fixedly attached to, or removably attached to another fitting within the room. The room may be an interior space, and exterior space or a portion thereof.

The illumination component may be configured to produce illumination in one or more hues. The safety detection device may configure the illumination frequency, pattern, brightness or hue of the illumination component to represent alert status information or operating status information of the device. In one embodiment, the illumination component may be configured to provide a blinking red light when smoke is detected.

The hue of the illumination of the light fitting may be configurable and may be dependent upon the status of the detection device. The hue of the illumination may be remotely configurable, by a remote device or a hub device which is in communication with the illumination component, either directly, or indirectly via the detection device.

The hue of the illumination component may be configured to indicate operating status information and/or alert status information of the detection device and/or the light fitting. The hue of the illumination of the light fitting may be configured to indicate other information.

The hue of the illumination component may be variable or changeable. The variation or change in hue may signify operating status or alert status information. The illumination component may be configured to flash or display a sequence of illumination states.

The detection device may include one or more status outputs to indicate the operating or alert status of the detection device. The status outputs may include a speaker, one or more lights, one or more visual displays or connections to remote alert devices.

A speaker of the detection device may be configured to produce an audible noise in response to a triggering operating status or alert status of the detection device. One or more status lights of the device may be configured to illuminate in response to the detection device entering an operating status or alert status. The illumination frequency, pattern or hue of the status light may indicate the current operating or alert status of the device.

The detection device may include control inputs to allow the user to control the operation of the detection device or the electrical fixture to which the detection device is integrated. The control inputs may comprise one or more buttons, switches, touch screens or a microphone to receive voice command inputs.

The detection device may receive input from a user via the control inputs and the detection device may adjust the operating or alert status of the detection device in response to receiving input via the control inputs.

The detection device may include a controller, which controls the operation of the detection device. The controller may receive and process information from the sensors regarding sensed levels for one or more environmental parameters. The controller may compare the sensed levels for the one or more environmental parameters with preset or preconfigured acceptable ranges or levels to determine whether the sensed levels are acceptable. In the event that one or more levels fall outside the relevant acceptable range or level, the controller may change the status of the detection device to an alert state, follow an alert procedure, and control the status outputs to indicate alert state information.

The controller may control operation of the electrical fixture. In an alert state, the controller may control the operation of the electrical fixture to signify alert information or to provide safety assistance. For example, in the case that the electrical fixture is a ceiling light, in the event of a fire alert, the controller may switch on the light to assist the user to find an exit route. Alternatively, if the electrical fixture is an exhaust fan, in the event of a carbon monoxide alert, the controller may switch on the fan to draw the carbon monoxide out of the building.

The detection device may be configured to provide status updates and other information via the internet, cellular network or other communication means to applications on remote servers or devices. The smoke detection device may be communicably connected to a cloud server system, and may be communicably interconnected to peer detection devices.

The detection device may include a communication module, configured to enable the detection device to communicate with remote devices.

The detection device may be in communication with other similar devices. The similar devices may be peer devices which perform a similar function as the detection device.

Wireless communication between peer detection devices may be achieved via 802.11 wireless communication protocols, cellular communication protocols, infra red protocols, Bluetooth or other Near Field Communication protocols, short messaging service (SMS) or other communication protocol. The peer devices may also communicate via wired communication protocols.

The device may be in communication with a hub device. The hub device may be interconnected with other electronic devices within the building. The detection device may be remotely controlled by an application operating on a hub device.

The detection device may be communication with one or more remote devices, and may be remotely controlled by one or more remote devices. The remote devices may comprise mobile devices such as a mobile phone, or other smart device. The device may be remotely controlled by an application operating on a mobile device.

The detection device may be configured to communicate status and alert information to one or more remote devices, including mobile devices or hub devices. In the event of the detection device entering an alert state, the device may communicate information about the alert to remote devices, such as a mobile phone or home hub, or to applications via wired or wireless connectivity. The alert information may define the nature, location, intensity or other information pertaining to the alert. The device may also communicate operating status information, such as functionality, current configuration, location, connectivity. The device may also record and communicate logging information such as historic environmental parameter levels, past alert events and past configuration events.

The detection device may have smart home connectivity and be integrated into the home via the Internet of Things. The communication module may be configured to transmit and repeat Wi-Fi signals to improve wireless communication coverage. The detection device may have a battery power source to enable functionality in the event of failure of the power source.

In another form, the invention resides broadly in a light fixture, for installation in a building, the light fixture including a smoke detection device, for detecting at least smoke in the building, the smoke detection device being integrated with the light fixture such that the smoke detection device is concealed by the light fixture when installed.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

According to a preferred embodiment of the present invention, there is provided a safety detection system 100 comprising a smoke detection device 101 and an electrical fixture 112.

Figure 1:
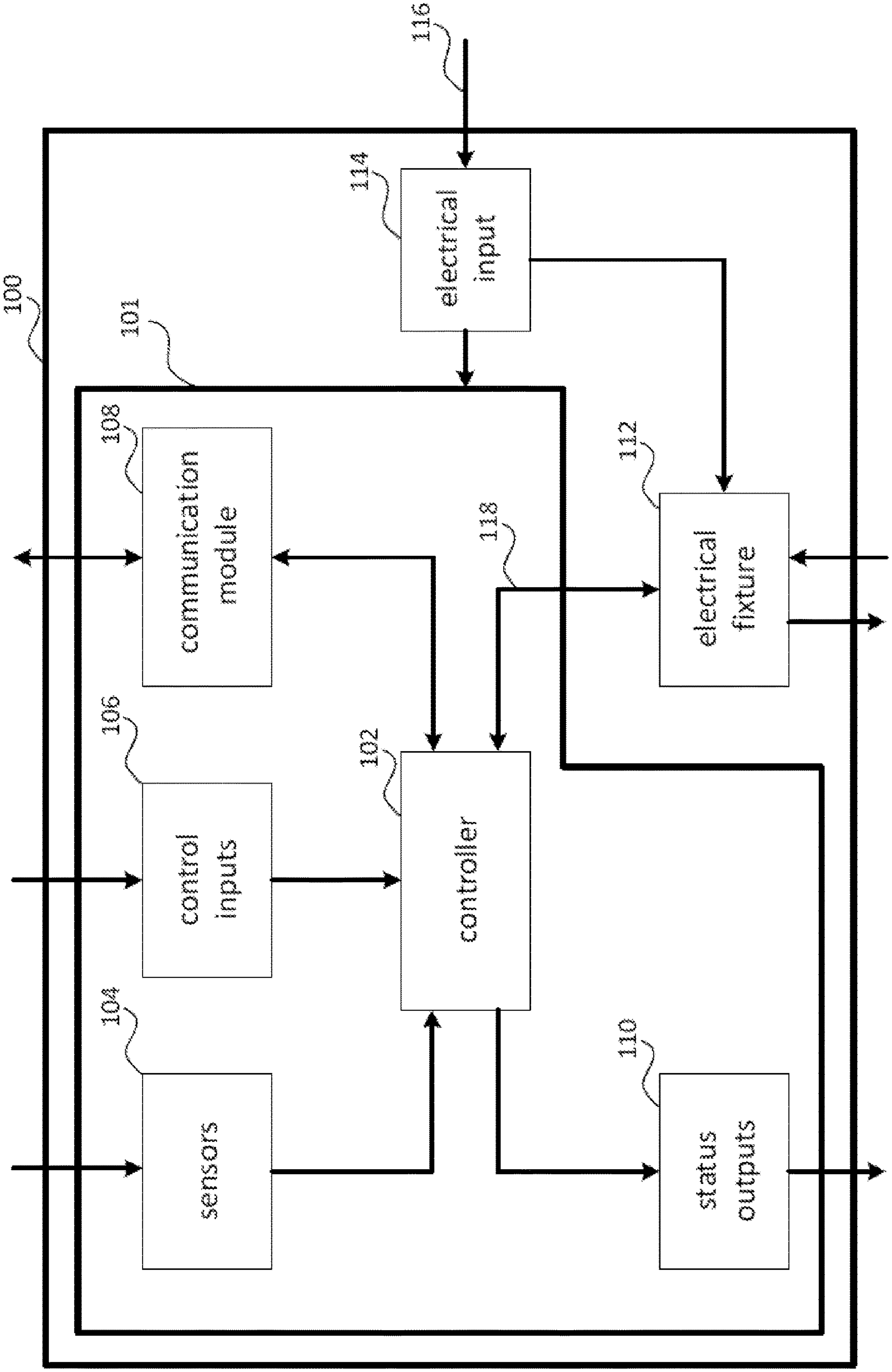
FIG. 1 illustrates a schematic of a safety detection system, according to an embodiment of the present invention.

According to a preferred embodiment shown in FIG. 1, a power source 116 provides mains power to the electrical input 114 of the safety detection device 100. The electrical input provides power to the smoke detection device 101 and the electrical fixture 112.

The smoke detection device 101 includes a plurality of sensors 104. The sensors 104 include an ionisation sensor configured to detect and react to particles emitted in a fire, a photoelectric sensor configured to detect smoke, a carbon monoxide sensor configured to detect levels of carbon monoxide in the atmosphere surrounding the detection device, and a temperature sensor configured to detect temperatures in the vicinity of the detection device (excessive temperatures may be indicative of a fire).

In the embodiment shown in FIG. 1, the electrical fixture 112 is an illumination component, specifically a ceiling light. The person skilled in the art will understand that in alterative embodiments of the invention, the electrical fixture may comprise a ceiling fan, air conditioning unit, ceiling fan incorporating a lighting component, another type of light or another powered component integrally formed with or affixed to the building or structure.

The illumination component 112 provides illumination in the space in which the system 100 is installed. The illumination component 112 is configurable to provide illumination in a plurality of hues or colours and in a range of brightness.

The user can configure the illumination device 112, to produce a desired illumination hue and brightness, by selecting the desired configuration via the control inputs 106 of the system 100, or via applications in communication with the system via the communication module 108.

The sensors 104 monitor the levels of environmental parameters within the vicinity of the detection device. The sensors 104 provide information regarding the levels of the environmental parameters to the controller 102. The controller 102 determines whether the detected levels are within the acceptance range or at an acceptable level (as pre-set or configured) or whether the levels indicate an alert situation.

Alternatively, the sensors 104 may be configured to provide a signal to the controller 102 in the event of an alert situation, rather than provide a continuous stream of levels. This may be particularly relevant in the case of smoke, which can be detected as either being present or absent.

The status outputs 110 include a speaker and a plurality of status lights. In alternative embodiments, the status outputs may be connected to remote status outputting devices, such as lights or speakers located remote from the device, or a vibration mat located in a bed. A vibration mat can provide a non-audible alert signal to provide an alert for persons unable to be alerted by audible signals.

In the embodiment of the invention as shown in FIG. 1, the power source 116 provides power to the electrical input 114 which is electrically connected to components of the safety detection system 100, including the smoke detection device 101, the controller 102, the communication module 108 and the status outputs 110. The electrical input 114 also provides power to the electrical fixture 112. In the embodiment depicted in FIG. 2, the electrical input 114 is connected to the mains power source 116 of the building or structure in which the detection system 100 is installed. In another embodiment, the power source may be another type of power source. The electrical input 114 may also include a battery configured to provide battery power to the safety detection system 100 as an alternative to mains power. This may be especially advantageous in the event of a power outage.

The controller 102 controls the smoke detection device 101 through the transition between its operational states. Under normal use, the detection device 101 operates in a detection operating state for a large proportion of the time. Within the detection operating state, the detection device senses the levels of detectable environmental parameters.

In the event of an alert event (or emergency) the detection device 101 enters an alert operating state. The functionality of the detection device 101 in the alert operating state is dependent upon the nature of the alert and the configuration settings of the detection device 101 at the time of the alert event occurring.

The detection device 101 is configured to provide an indication of the alert event via an audible signal emitted from the speaker, and illumination of the status lights. The detection device may also be configured to send alert information to the hub device, remote applications and remote devices including user's mobile phone, via communication networks. The detection device 101 may also be configured to send alert information to the peer detection devices via wireless or wired communication networks.

In the embodiment depicted in FIG. 1, the detection device 101 is configured to send a control signal to the electrical fixture 112 via the communication link 118 between the controller 102 and the electrical fixture 112, in the event that the sensors 104 detect an alert event. The control signal sent via the communication link 118 is configured to alter the operating status of the electrical fixture to provide assistance to the user in the event of an emergency.

The electrical fixture 112 is a ceiling light in the embodiment depicted in FIG. 1. In this embodiment, the controller 102 is configured to send a control signal to the ceiling light 112, via the communication link 118, which turns on the ceiling light 112 to enable the user to locate an exit from the building in the event of an emergency.

In the event of an alert event or emergency, the controller 102, communicates to peer devices located in the building, via the communication module, to indicate that the smoke detection device 101 has detected an emergency, and entered an alert operating status. Depending upon the configuration of the peer detection devices, the peer detection devices may response to receipt of this communication from the smoke detection device 101 by also entering an alert operating status, and by also sending control signals to their respective electrical fixtures, instructing the electrical fixtures to change operational status to assist the user in the emergency situation.

Figure 2:
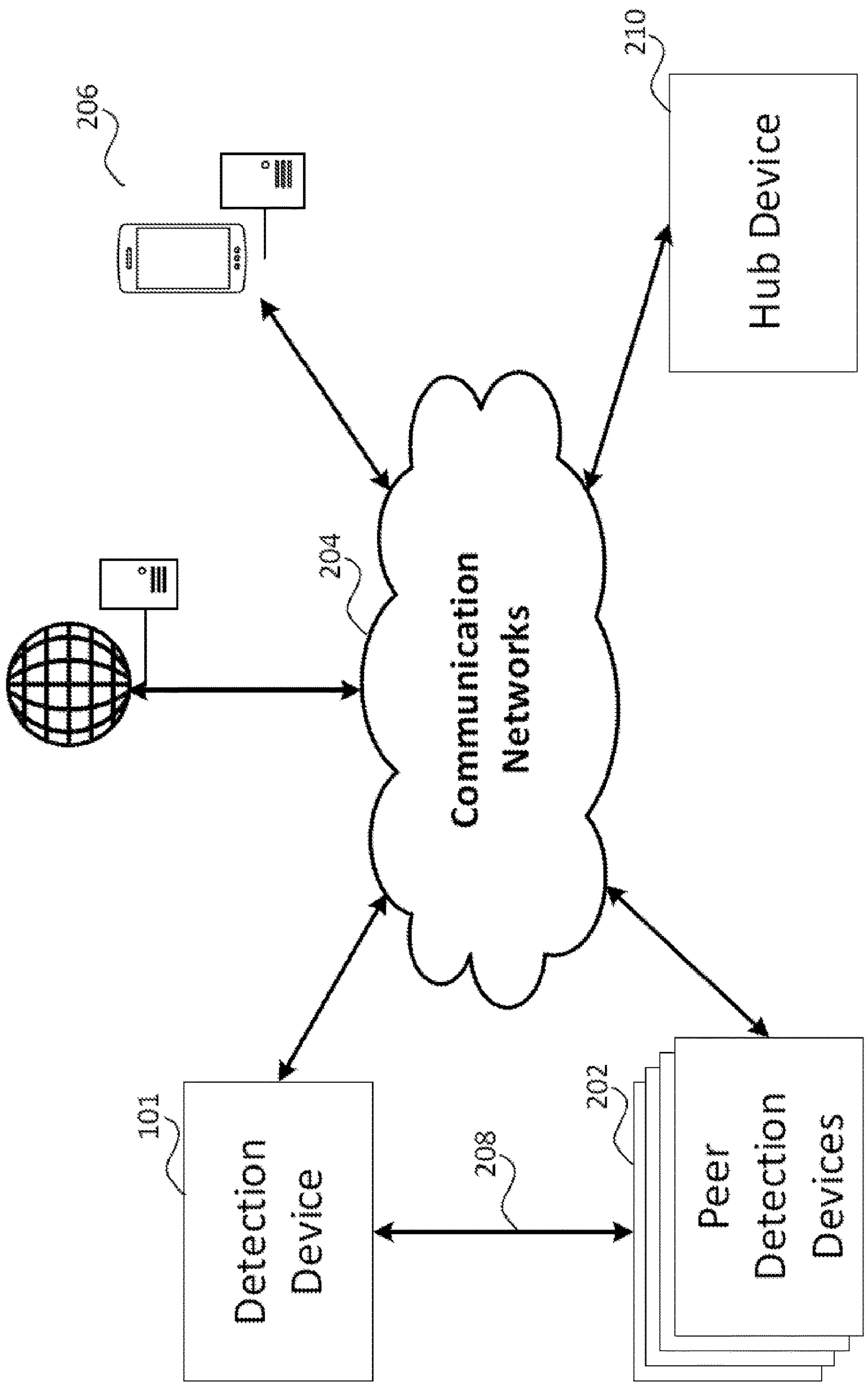
FIG. 2 illustrates a schematic of a safety detection system, according to an embodiment of the present invention.

In the embodiment depicted in FIG. 2, the detection device 101 is communicatively connected with a network of interconnected components, including a hub device 210, one or more remote servers and the internet 212, one or more mobile communication devices 206 and peer detection devices 202.

The hub device 210 acts as a central control point to communicate with and control select electronic devices within the residence or building. The hub device 210 is communicably interconnected with the detection device 101 and each of the peer detection devices 202, to receive status information from the detection devices 101, 202, and to provide configuration and control information to the detection devices 101, 202.

In the embodiment of the invention depicted in FIG. 2, the hub device 210 communicates with the detection devices 101, 202 via a wireless internet protocol based on the IEEE 802.11 LAN protocols. The hub device 210 is also communicably connected to servers in the cloud to enable the sending of status information from the hub device 210 to applications on remote servers, and to remote devices such as users' mobile phones via email protocols or cellular network protocols. The hub device 210 is also configured to receive configuration information from applications operating on remote servers, or from applications operating on remote users' devices. Such configuration information may pertain to the operation of the hub device 210, the hub device's connectivity with the detection devices or instructions regarding the hub device's configuration of the detection devices.

In some embodiments of the invention, the detection device 101, 202 could be simple devices which have limited communication connectivity. For example, the detection devices 101, 202 may not be configured to communicate to applications on remote servers via the communication networks 204. Rather, the detection devices may be configured to communicate only with the hub device 210. In such an embodiment, the hub device would act as a relay, or a gateway, through which the detection devices communicate with external applications to provide status information, and the external applications communicate with the detection devices to provide configuration information. Advantageously, such an arrangement would negate the need for a complex, fully communicably connected detection device to be installed in each room of the building. Simplification of the functionality of the detection devices has the potential to reduce complexity and cost.

In the embodiment of the invention as depicted in FIG. 2, the detection device 101 is in communication with peer detection devices (collectively numbered 202). Each of the peer detection devices 202 may be located in a different room or area of a building, to detect environmental parameters within different rooms or areas of the building. Within a typical residential house, a detection device may be located in each of the kitchen, lounge room, bedrooms and hallway.

The peer detection devices 202 may be substantially identical to the detection device 101, or may differ in terms of functionality and purpose. Typically, a detection device located in a kitchen would be configured differently to detection devices located in a bedroom, for example, to account for the naturally highly levels of heat, smoke and other factors within a kitchen compared to a bedroom.

The detection device 101 is communicatively connected to the peer detection devices via the communication networks 204. The communication networks 204 include wireless internet protocols, cellular networks and near field communication networks. In the embodiment depicted in FIG. 2, the detection device 101 is also communicatively connected to the peer detection devices 202 via a wired communication channel 208. The wired communication channel 208 provides a secondary communication means to allow communication between the detection devices in the event of interference or blockage of the wireless communication networks 204.

In the event that the detection device 101 detects an alert event and consequently enters an alert state, the detection device 101 communicates with one or more of the peer detection devices 202, via the communication networks 204 or via the wired communication channel 208, to indicate that it has entered an alert operating state and to indicate the nature of the alert event that has occurred. The peer communication devices 202 are configured to also enter an alert operating state upon receiving communication that the detection device 101 has entered an alert operating state. Similarly, the detection device 101 is configured to enter an alert operating state upon receiving communication indicating that a peer detection device 202 has entered an alert operating state.

The detection device 101 and the peer detection devices 202 may provide a coordinated alert response by providing identical indications of the alert audibly and visually, or by providing differing alert responses which aid the user to reach safety in the event of an emergency. In the scenario where the electrical fixtures integrated with the detection device and the peer detection devices are ceiling lights, an example of a differing alert response would be the ceiling lights situated close to the source of the smoke being illuminated in red, and the ceiling lights situated along a route to a safe exit being illuminated in green, to aid the user locate a safe exit.

The safety detection system 100 is installed by connecting the electrical input 114 to the mains power of the building, via the power input 116. Advantageously, the electrical installation of the safety detection system 100 requires only a single electrical connection, namely the electrical connection of the electrical input to the building's power source, in order to electrically connect both the smoke detection device and the electrical fixture.

Additionally, during installation, the safety detection system, incorporating the electrical fixture, is physically affixed to the building in a position which enables correct function of the electrical fixture 112, and adheres to positioning regulations for the smoke detection device 101. Advantageously, the physical installation of both the electrical fixture 112 and the smoke detection system 101 can be achieved during the single step of installing the combined safety detection system 100.

Figure 3:
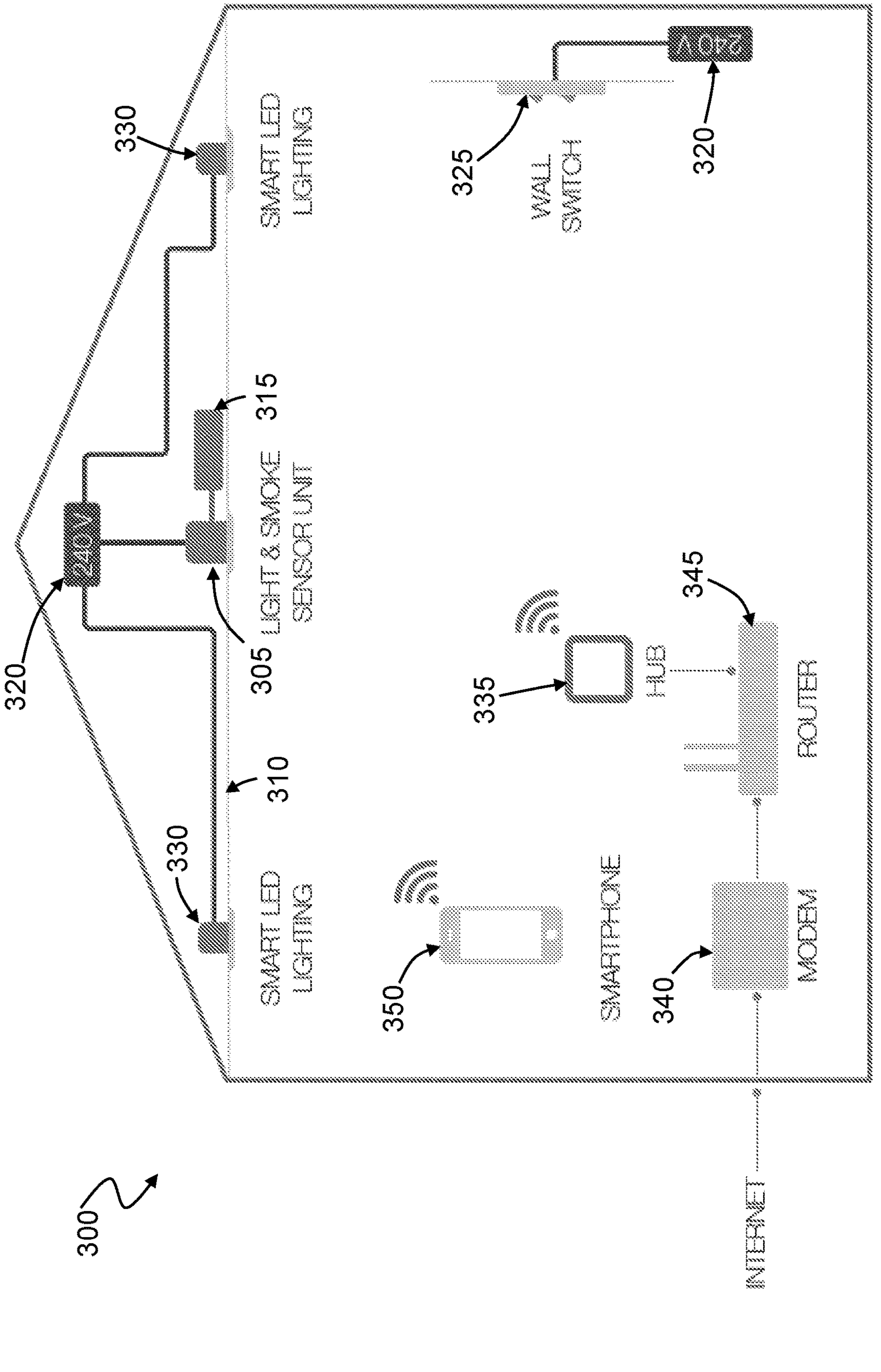
FIG. 3 illustrates a schematic of a building including a safety detection system, according to an embodiment of the present invention.

FIG. 3 illustrates a schematic of a building 300 including a safety detection system, according to an embodiment of the present invention.

The building 300 includes a light fixture 305 in the form of a downlight, installed in a ceiling 310 of the building 300. A smoke detection device 315 is integrated with the light fixture 305 and is concealed by the fixture 400 and ceiling 310. As outlined in further detail below, the light fixture 305 may include apertures allowing airflow to the smoke detection device 315.

The light fixture 305 is coupled to a switched power supply 320, the switched power supply 320 being switched using a wall switch 325, as is well known in residential buildings.

A plurality of further light fixtures 330 are also coupled to the switched power supply 320, and therefore can also be selectively switched on to illuminate an inside of the building 300.

As the power supply 320 is switched, it is not always powered, and as such, a battery is provided in association with the smoke detection device 315. The battery may be rechargeable or replaceable.

The light fixture 305, smoke detection device 315 and further light fixtures 330 are also coupled to a hub 335. The hub 335 is coupled to the Internet by a modem 340 and router 345, as is well known in relation to computing devices. This enables the lights of the light fixture 305 and further light fixtures 330 to function as smart lights, and also enables the lights of the light fixture 305 and further light fixtures 330 to function in a coordinated manner when smoke is detected.

The hub 335 may provide a human interface, enabling a user to interact directly with the system. In one such embodiment, the hub 335 may include a microphone to enable voice control. As an illustrative example, a user may interact with the system using voice commands, such as a command to deactivate a smoke alarm in case of a false alarm (e.g. burnt toast).

Finally, a smartphone 350 is also coupled to the hub 335, and thereby to the light fixture 305, smoke detection device 315 and further light fixtures 330. This enables control of the light fixture 305, smoke detection device 315 and further light fixtures 330 using the smartphone 350. As an illustrative example, the smartphone 350 may be used to initiate self-testing of the smoke detection device 315, change a configuration of the light fixture 305 and further light fixtures 330, or receive alerts or other information relating to the smoke detection device 315.

Figure 4:
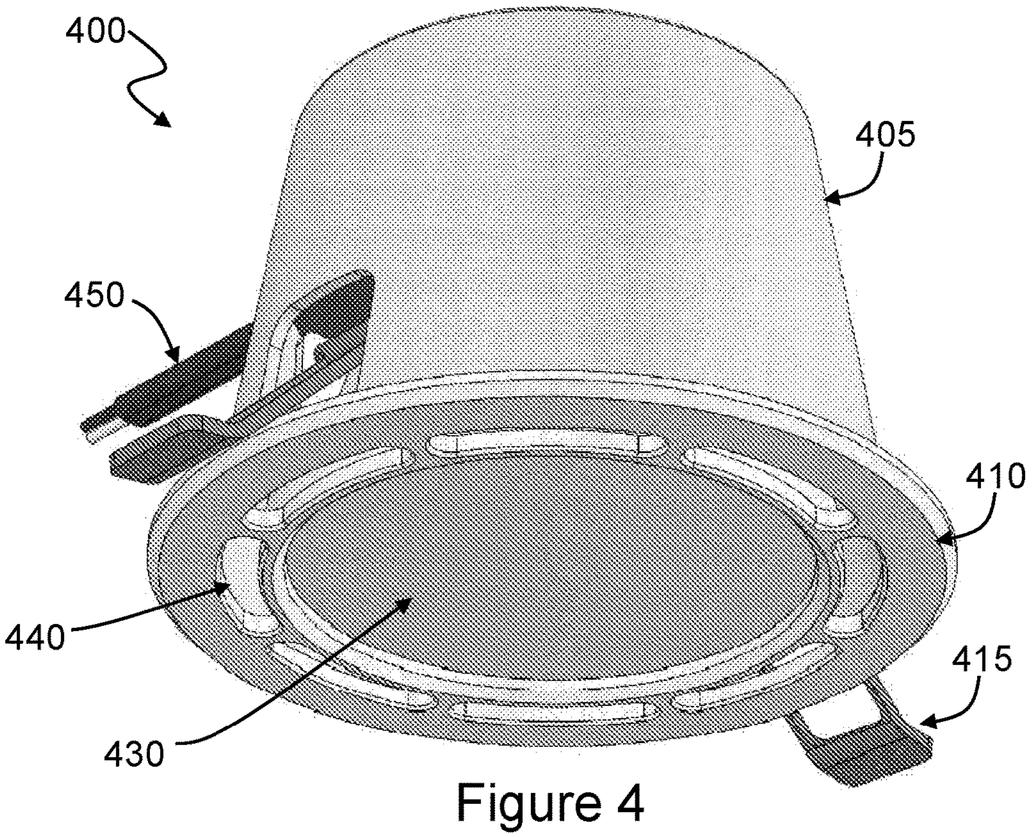
FIG. 4 illustrates a lower perspective view of a light fixture, for installation in a building, according to an embodiment of the present invention.
Figure 5:
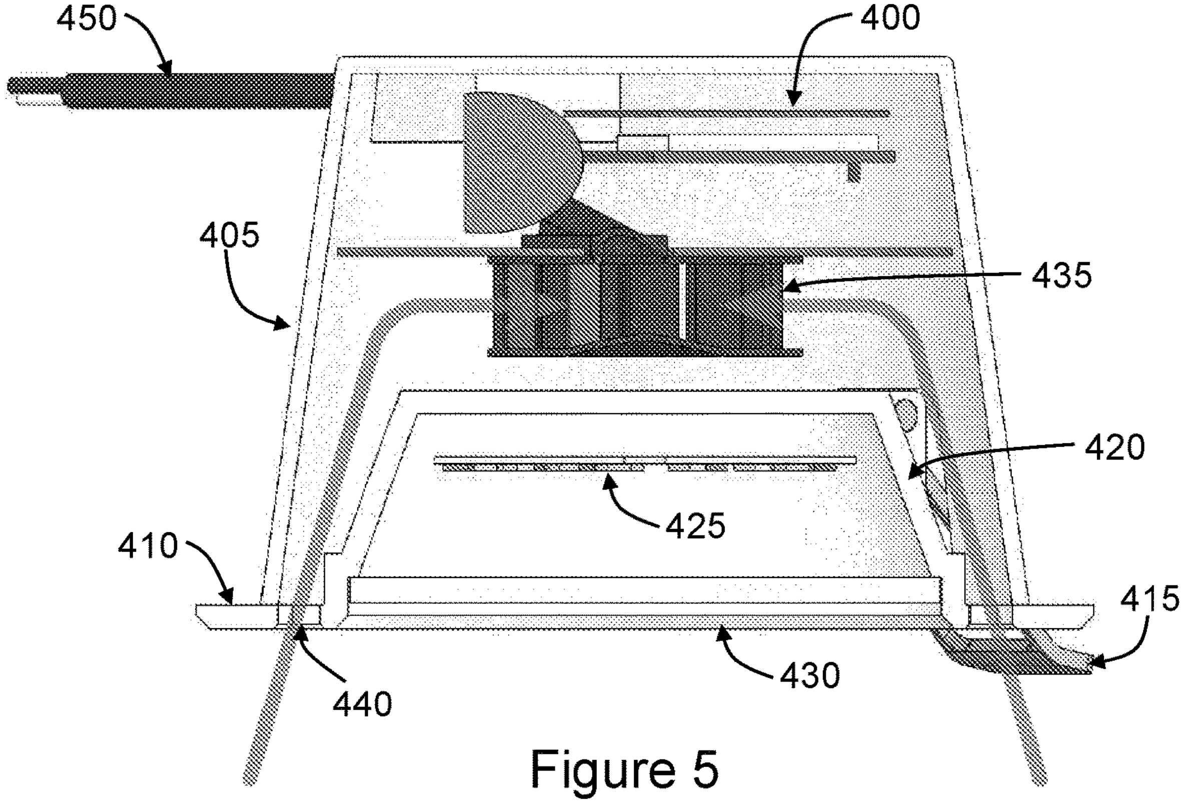
FIG. 5 illustrates a cutaway view of the light fixture of FIG. 4.
Figure 6:
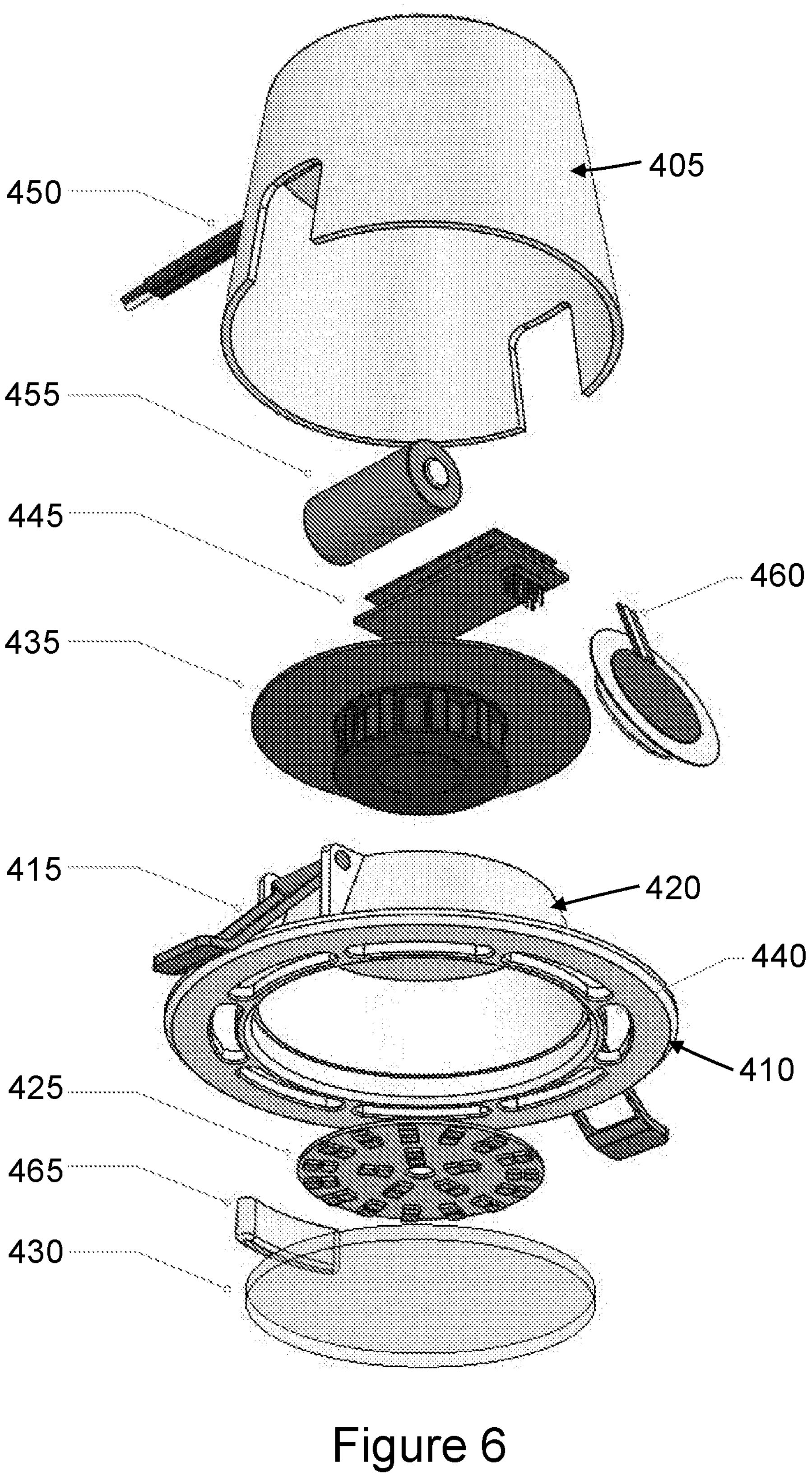
FIG. 6 illustrates an exploded view of the light fixture of FIG. 4.

FIG. 4 illustrates a lower perspective view of a light fixture 400, for installation in a building, according to an embodiment of the present invention. The light fixture 400 is similar to the light fixture 305 and smoke detection device 315 albeit integrated into a single unit such that the smoke detection device is concealed by the light fixture 400 when installed. FIG. 5 illustrates a cutaway view of the light fixture 400, and FIG. 6 illustrates an exploded view of the light fixture 400.

The light fixture 400 is in the form of a downlight for installation in a circular aperture of a ceiling of the building. The light fixture includes an outer body 405, which is configured to be received in, and extend into the ceiling of the building. A faceplate 410 is provided at a lower end of the fixture 400, and is configured to held against the ceiling using spring loaded retainers 415. The outer body 405 is smaller than the aperture and the faceplate 410 is larger than the aperture, and the spring loaded retainers 415 bias the faceplate 410 to an underside of the ceiling.

As best illustrated in FIG. 5, the light fixture includes an inner body 420, which houses a light in the form of an LED array 425. The inner body 420 is integrally formed with the faceplate 410, e.g. of aluminium, and thereby may function as a heatsink to the LED array 425.

The inner body 420 includes a diffuser 430 at a lower end thereof, which enables the light from the LED array 425 to illuminate the area in a uniform and aesthetically pleasing manner.

The outer body defines a reservoir including a smoke detection device 435. The reservoir is frustoconical in shape, but in other embodiments may take other forms including a substantially cylindrical shape. The light 425 is positioned below the smoke detection device 435 within the reservoir to thereby conceal the smoke detection device 435. As such, the light fixture has an appearance similar to that of an ordinary light fixture.

A plurality of apertures 440 are positioned around a periphery of the faceplate 410, to enable airflow into the reservoir. The reservoir is positioned behind the light 430 and inner body 420, and a channel is defined between the outer body 405 and inner body 420, through which air may travel as outlined by arrows in FIG. 5.

As best illustrated in FIG. 6, the light fixture 400 includes a wireless (RF) antenna module 445, which enables wireless communication between the light fixture 400 and other devices (e.g. other light fixtures, or computing devices, such as smartphones). As outlined above, such communication may be via a wireless hub, and may be through the Internet.

The fixture 400 is powered by a power cable 450, which is associated with a battery 455 as backup. The power cable 450 is a switched power supply, and is adapted to directly power the light 425. As such, the light 425 may be switched on or off using a light switch.

The backup battery 455 is configured to power the smoke detection device 435 and the wireless (RF) antenna module 445 when the power cable 450 is switched off, i.e. when the light 425 is turned off. As such, the smoke detection device 435 is able to function fully, even when power is not provided by the power cable 450.

The light fixture 400 includes a piezoelectric buzzer 460, coupled to the smoke detection device 435, to signal the presence of smoke in a similar manner to prior art smoke detection devices. The light 425 may also be configured to illuminate in an alert mode (e.g. blinking red) when smoke is detected.

Finally, the light fixture includes a test button 465, which may be used to initiate a test phase of the smoke detection device 435. The test phase may include any suitable function, and may include a test of the piezoelectric buzzer 460, the battery 455, or any other component of the fixture 400.

The faceplate 410 and inner body 420 are integrally formed of aluminium, which is both strong, lightweight, and functions as a heatsink to the light 425. The outer body 405 may releasably engage with the faceplate 410 and inner body 420.

Figure 7:
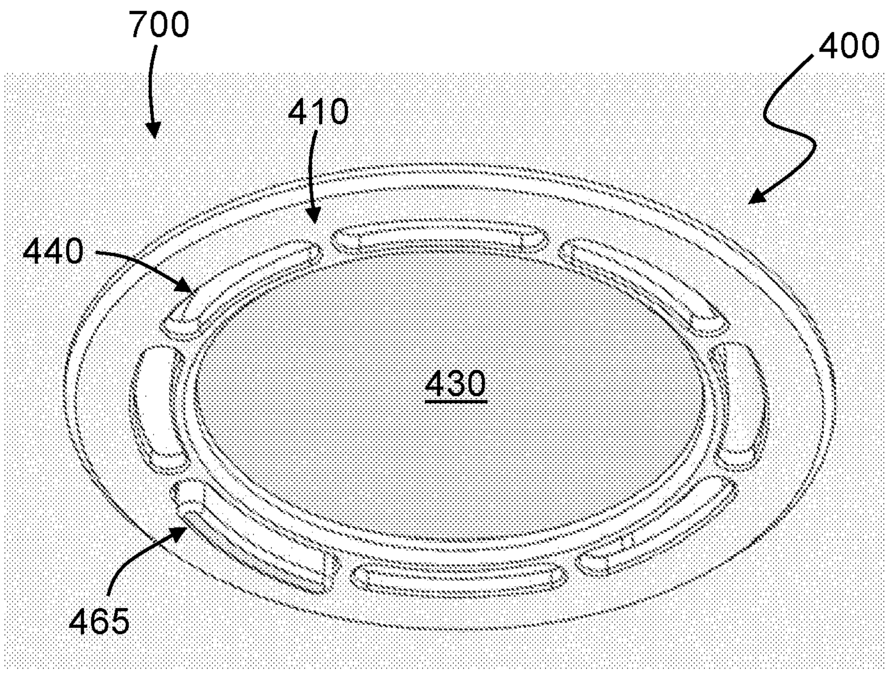
FIG. 7 illustrates a lower perspective view of the light fixture of FIG. 4 installed in a ceiling, according to an embodiment of the present invention.

FIG. 7 illustrates a lower perspective view of the light fixture 400 installed in a ceiling 700, according to an embodiment of the present invention. The outer body 405 is received entirely in an aperture in the ceiling 700, and the faceplate 410 completely conceals the aperture. As such, only the faceplate 710 and diffuser 430 is visible from below once the light fixture is installed.

Figure 8:
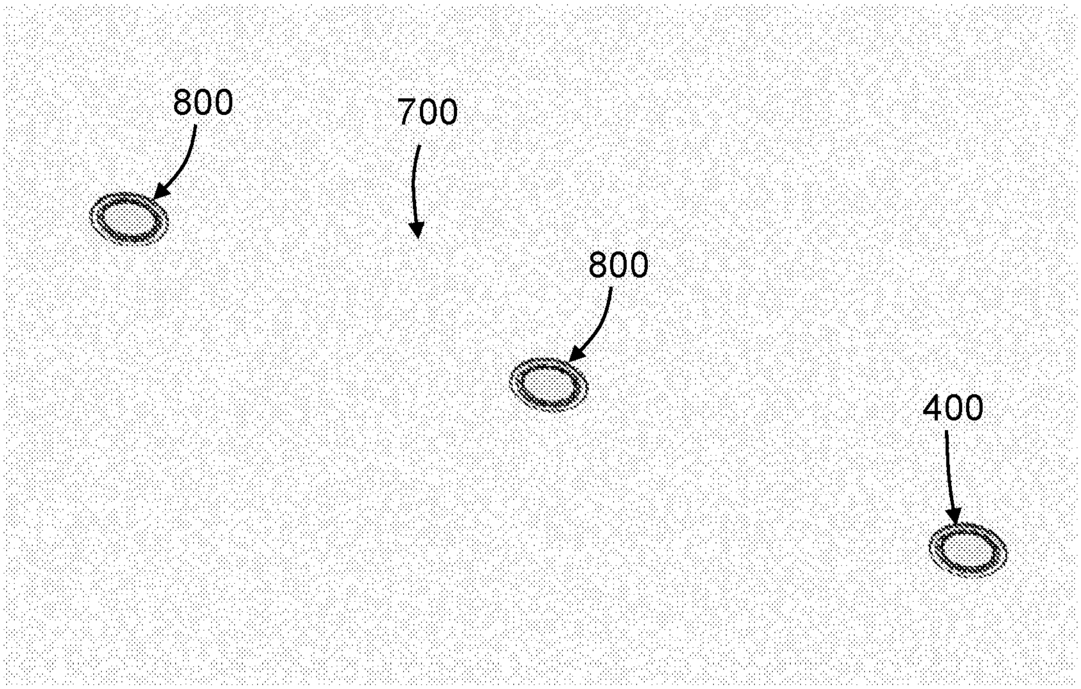
FIG. 8 illustrates the ceiling of FIG. 7 with the light fixture of FIG. 4 installed, and two adjacent light fixtures.

FIG. 8 illustrates the ceiling 700 with the light fixture 400 installed, and two adjacent light fixtures 800. The adjacent light fixtures 800 have an appearance similar (or identical) to the fixture 400 when installed, but do not include a smoke detection device. As such, the light fixture 400 may be visually identical (or very similar) in appearance to the light fixtures 800, and thus the smoke detection device is not visible in the building.

The light fixture 400 and fixtures 800 may be interconnected such that they operate in a coordinated manner when smoke is detected, as outlined in further detail below.

Figure 9:
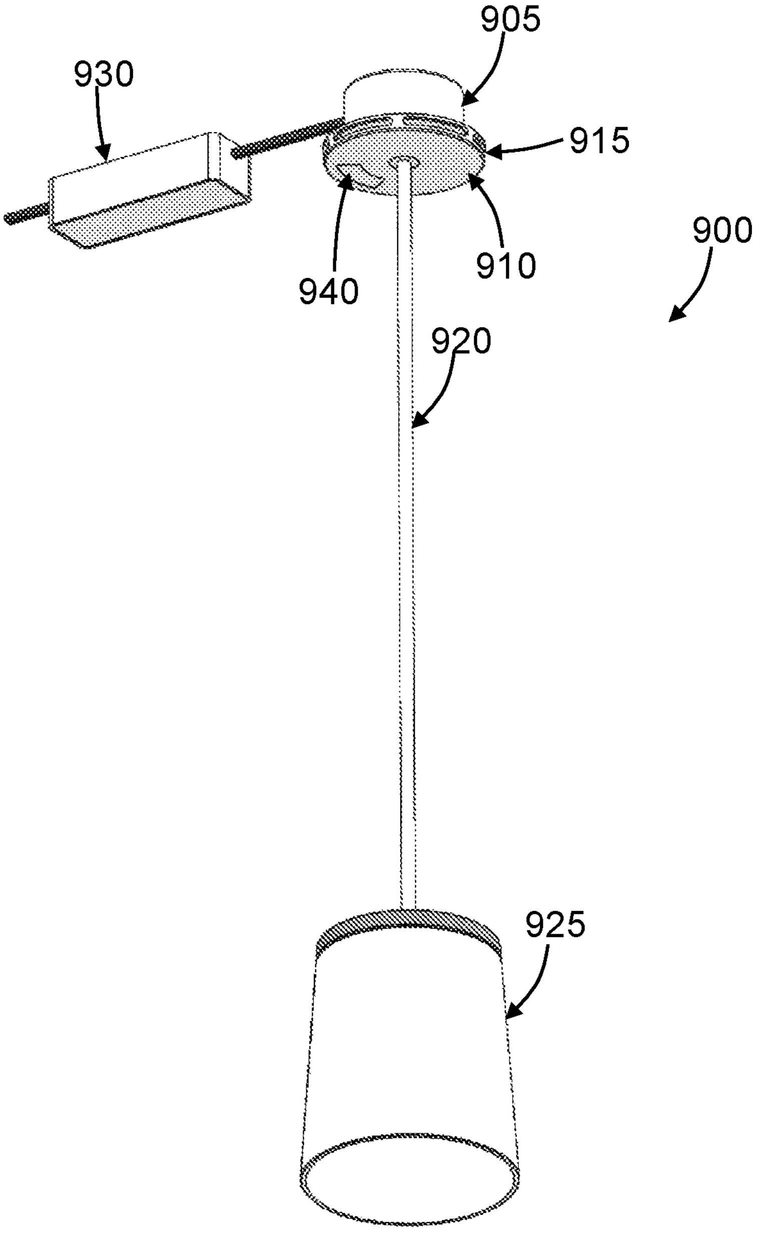
FIG. 9 illustrates a lower perspective view of a light fixture, for installation in a building, according to an embodiment of the present invention.
Figure 10:
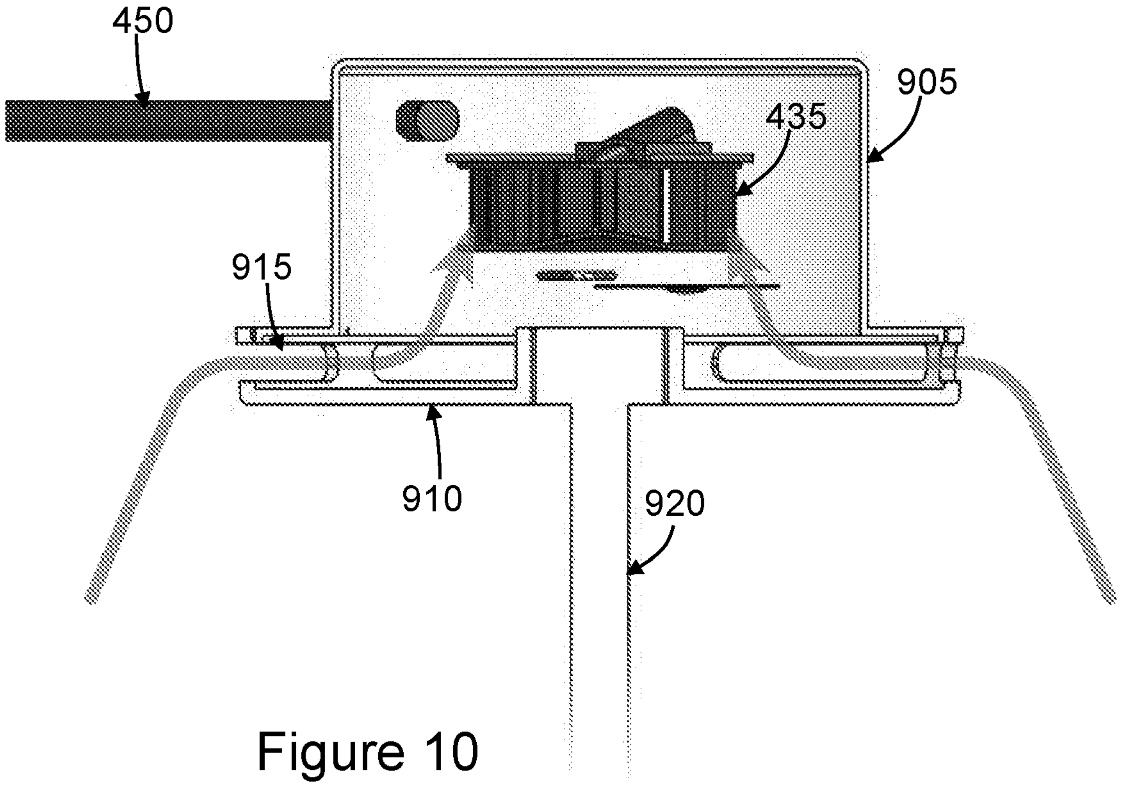
FIG. 10 illustrates a cutaway view of the light fixture of FIG. 9.
Figure 11:
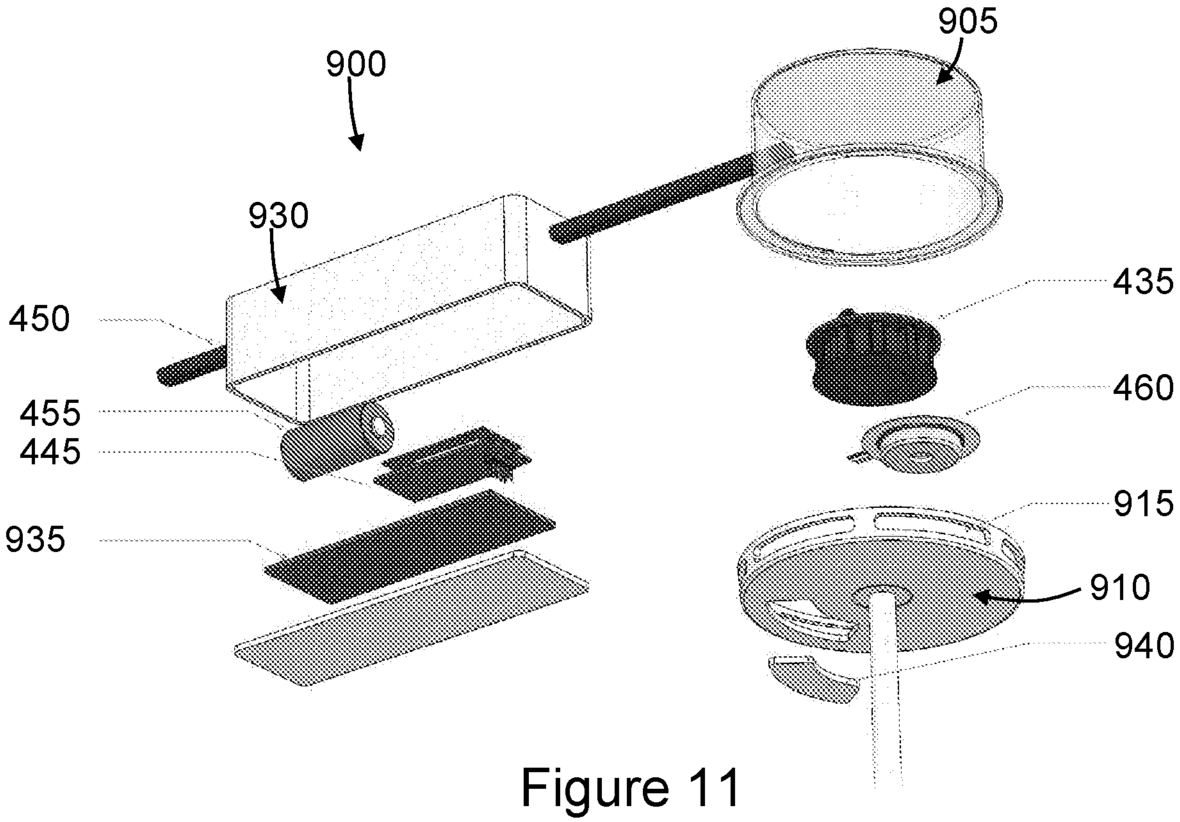
FIG. 11 illustrates an exploded view of the light fixture of FIG. 9.

FIG. 9 illustrates a lower perspective view of a light fixture 900, for installation in a building, according to an embodiment of the present invention. The light fixture 900 is similar to the light fixture 400, but comprises a pendant-style light fixture, rather than a downlight type light fixture. FIG. 10 illustrates a cutaway view of the light fixture 900, and FIG. 11 illustrates an exploded view of the light fixture 900.

The fixture 900 includes a body 905, to which a faceplate 910 is attached, similar to the outer body and faceplate of the fixture 400. The body 905 is configured to receive the smoke detection device 435 and piezoelectric buzzer 460, and the faceplate 910 includes apertures 915 around an edge thereof to enable airflow into a reservoir defined by the body 905. Much like the fixture 400, the smoke detection device 435 is concealed by the light fixture 900 when installed.

Instead of a diffuser and LED array, as was the case for the fixture 400, the fixture 900 comprises a pendant lamp including a cord 920, which extends downwardly from the faceplate 910, with a lampshade 925 at a lower end thereof. As will be readily appreciated, the lampshade is for housing a light (not visible), which is powered by the cord 920.

The fixture 900 includes an enclosure 930, which is generally cuboid in shape, which encloses the battery 455, the RF antenna module 445 and a main printed circuit board (PCB) 935, which includes circuitry of the fixture 900. The enclosure is configured to be received in a ceiling space, and thus be concealed when used.

Finally, the fixture 900 includes a test button 940, on the faceplate 910, for initiating a test procedure of the fixture 900, and in particular the smoke detection device 435.

Figure 12:
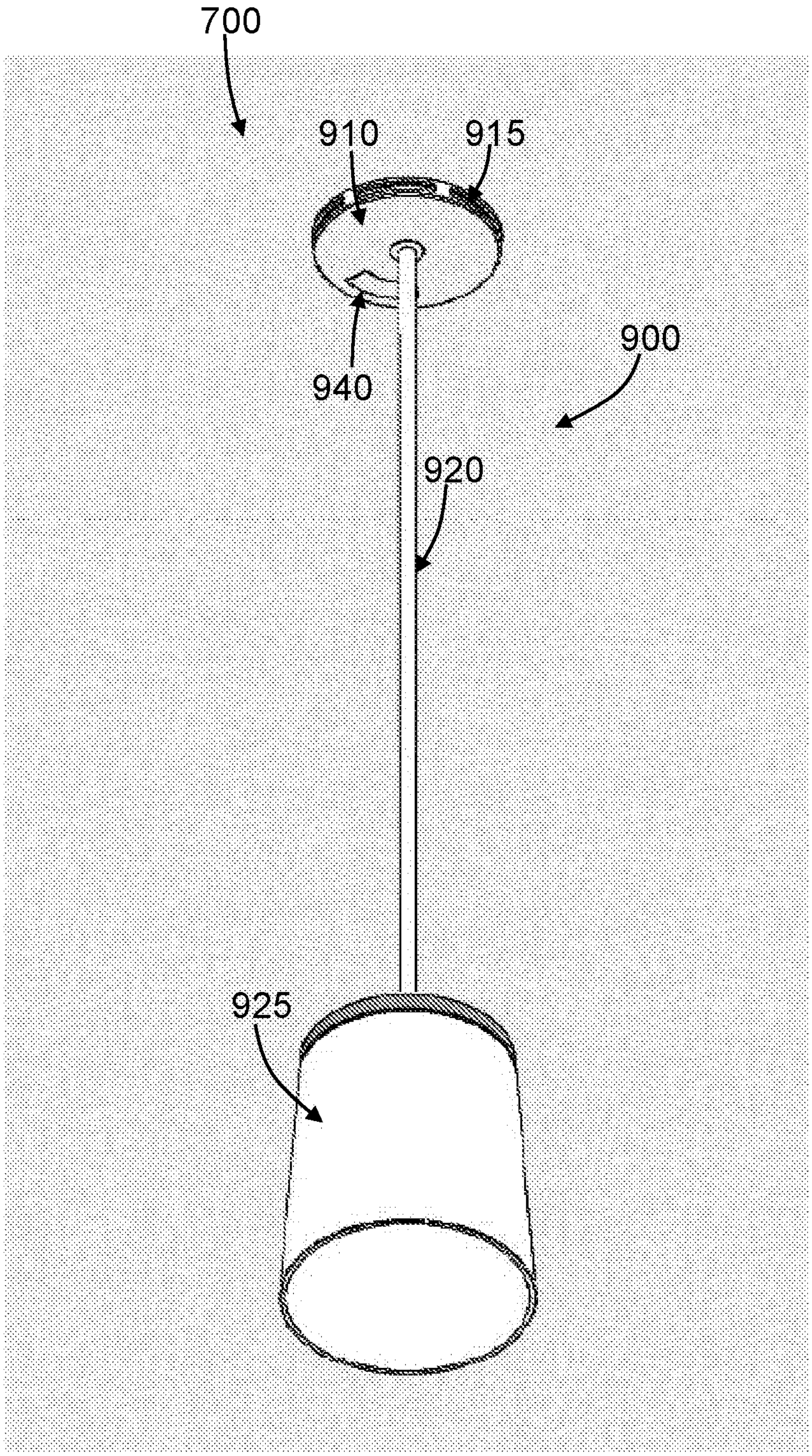
FIG. 12 illustrates the fixture of FIG. 9 installed in the ceiling of FIG. 7.
Figure 13:
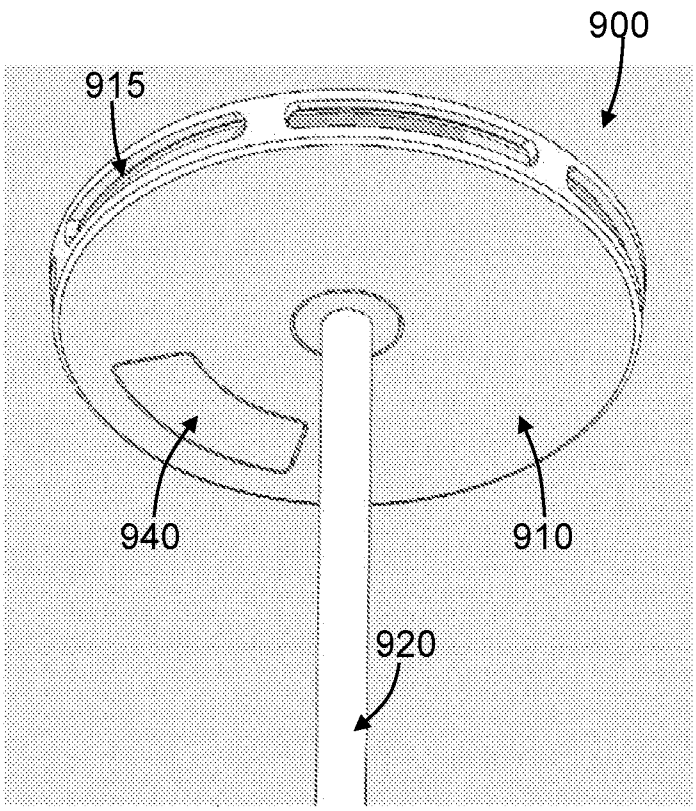
FIG. 13 illustrates an enlarged portion of the fixture of FIG. 9 installed in the ceiling of FIG. 7.

FIG. 12 illustrates the fixture 900 installed in the ceiling 700, and FIG. 13 illustrates an enlarged portion of the fixture 900 installed in the ceiling 700. As can be seen, the enclosure 930 and the body 905, are entirely concealed.

Figure 14:
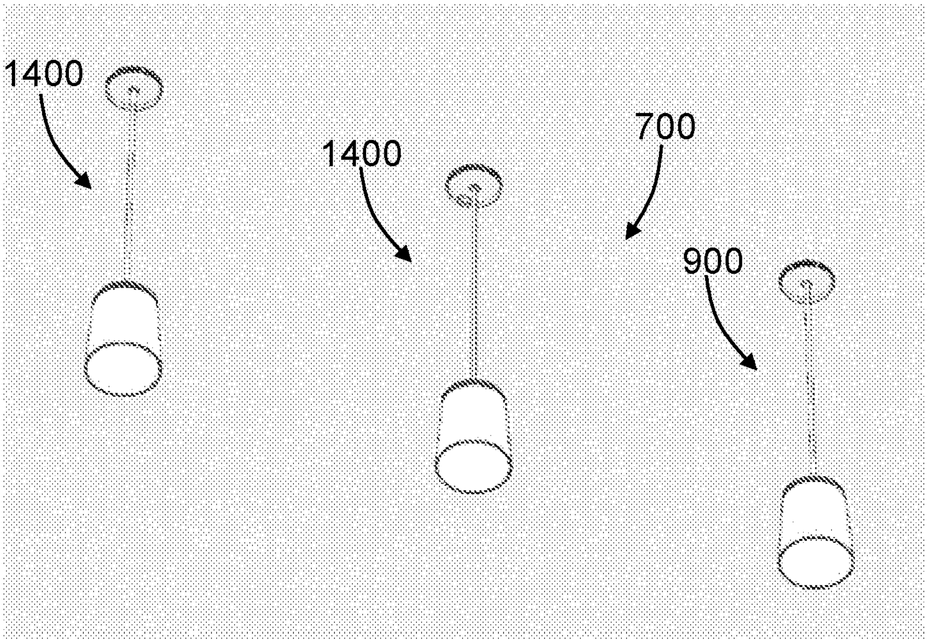
FIG. 14 illustrates the ceiling of FIG. 7 with the light fixture of FIG. 9 installed, and two adjacent light fixtures.

FIG. 14 illustrates the ceiling 700 with the light fixture 900 installed, and two adjacent light fixtures 1400. The adjacent light fixtures 1400 have an appearance similar (or identical) to the fixture 900 when installed, but do not include a smoke detection device. As such, the light fixture 900 may be visually identical (or very similar) in appearance to the light fixtures 1400, and thus the smoke detection device is not visible in the building.

The light fixture 900 and fixtures 1400 may be interconnected such that they operate in a coordinated manner when smoke is detected, as outlined in further detail below.

Figure 15:
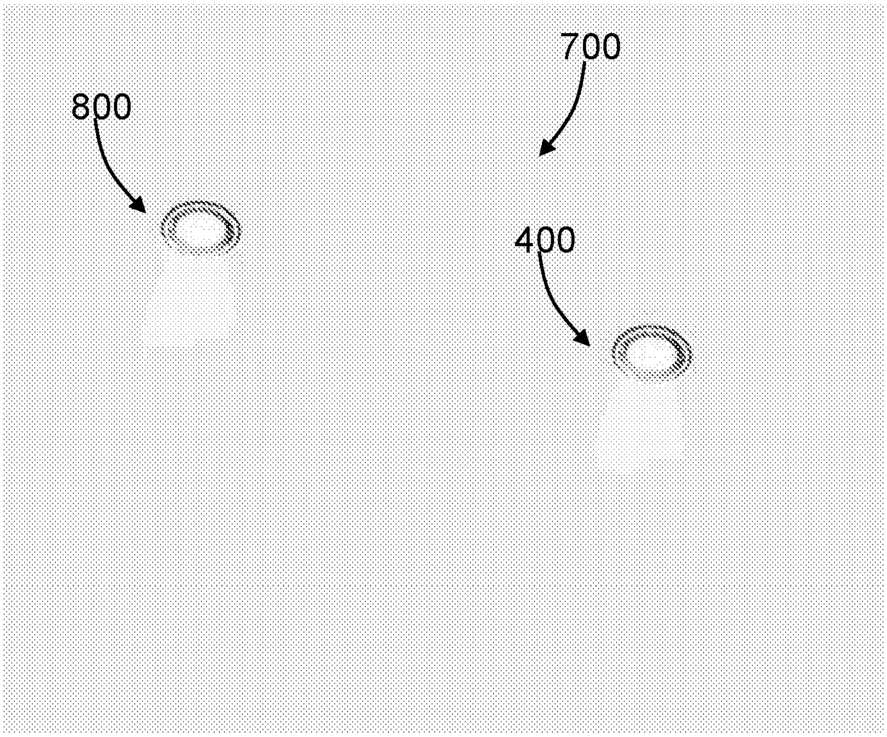
FIG. 15 illustrates the light fixture of FIG. 4 and an adjacent light fixture of FIG. 8 emitting a warm white light, to illuminate a room.

FIG. 15 illustrates the light fixture 400 and an adjacent light fixture 800 emitting a warm white light, to illuminate a room. Such configuration is typical when the light fixtures 400, 800 are ordinarily being used to illuminate an area.

Figure 16:
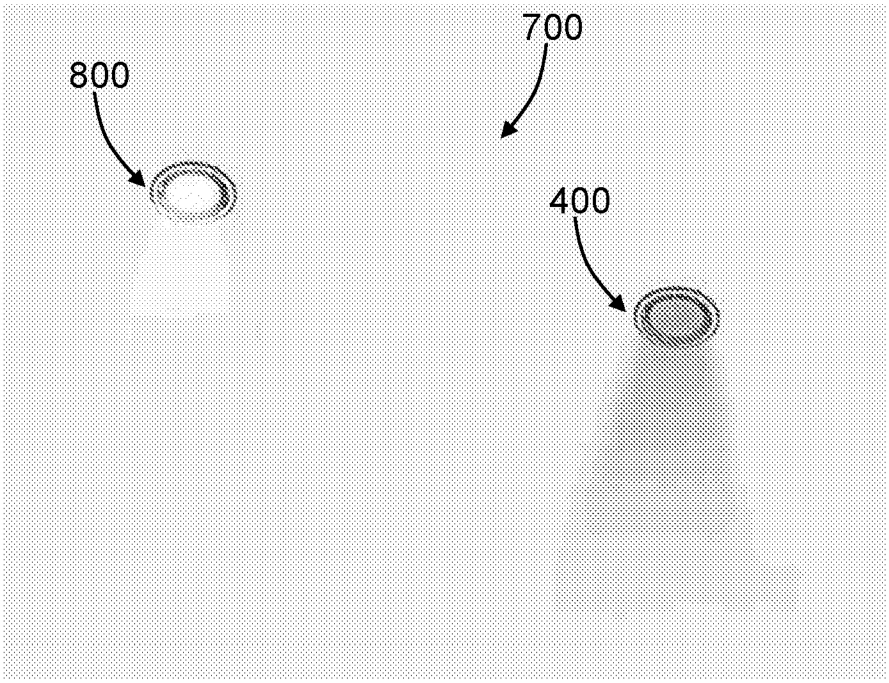
FIG. 16 illustrates the light fixture of FIG. 4 and an adjacent light fixture of FIG. 8 in an alert configuration.

FIG. 16 illustrates the light fixture 400 and an adjacent light fixture 800 in an alert configuration. The light fixture 400 is emitting a red light, while the light fixture 800 is emitting warm white light to illuminate the area. The skilled address will readily appreciate that both fixtures 400, 800 may emit red light, or any suitable hue of light, and in any configuration (e.g. blinking).

While the above descriptions relate to the use of fixtures in relation to switched power sources, the skilled address will readily appreciate that the fixtures may include a fixed and a switched power input.

Figure 17:
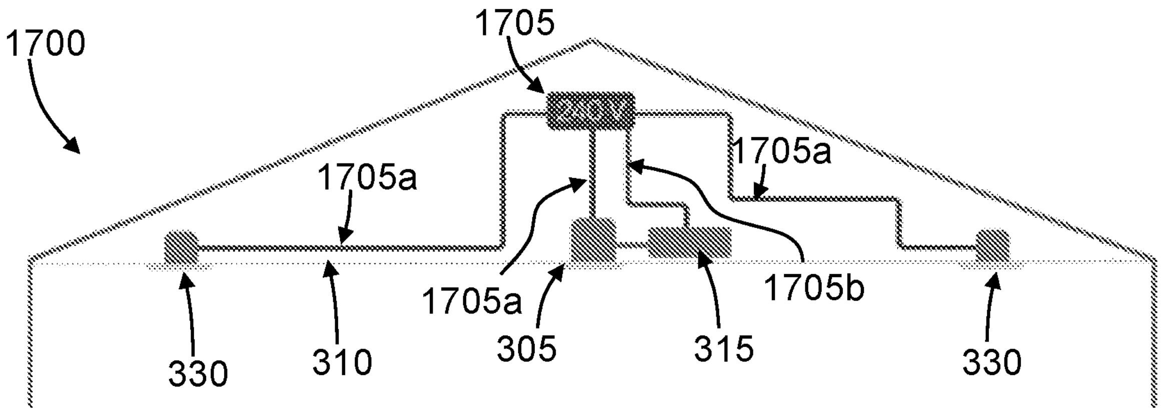
FIG. 17 illustrates a schematic of a building including a safety detection system, according to an embodiment of the present invention.

FIG. 17 illustrates a schematic of a building 1700 including a safety detection system, according to an embodiment of the present invention.

The building 1700 includes a light fixture 305 in the form of a downlight, installed in a ceiling 310 of the building 1700. A smoke detection device 315 is integrated with the light fixture 305 and is concealed by the ceiling 310. As outlined above, the light fixture 305 may include apertures allowing airflow to the smoke detection device 315.

The light fixture 305 and smoke detection device 315 is coupled to a power supply 1705, the light fixture coupled to a switched power supply 1705*a*, the switched power supply 1705 being switched using a wall switch, and the smoke detection device 315 is coupled to a fixed power supply 1705*b*. As such, the smoke detection device 315 is continuously powered, whereas the light fixture may be turned on and off using conventional means.

The skilled addressee will readily appreciate that the light fixture 305 and smoke detection device 315 may in alternative embodiments be both coupled to a fixed power supply, and the light may be turned on and off by signalling (e.g. wireless signalling from a wireless switch).

Advantageously, the system enables smoke detection devices to be installed in a manner that is out-of-sight, thus alleviating the need to unsightly smoke detection devices to be installed throughout a building. As electrical fixtures, such as light fixtures, are common throughout a building, smoke detection devices may be installed in association therewith with little to no additional labour cost.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A safety detection system, comprising:

a light fixture, for installation in a ceiling of a building; and a reservoir, configured to be at least partly received in a space defined above the ceiling and behind the light fixture, the reservoir including a smoke detection device, for detecting at least smoke in the building, wherein the smoke detection device is integrated with the light fixture such that the smoke detection device is concealed when installed, and wherein the smoke detection device comprises an inner body, separating the reservoir from the light fixture.

2. The safety detection system of claim 1, wherein the light fixture comprises a downlight fixture, the downlight fixture at least partly received in a space defined above the ceiling.

3. The safety detection system of claim 1, wherein the reservoir includes one or more apertures, configured to enable airflow into the reservoir.

4. The safety detection system of claim 1, wherein the light fixture includes a faceplate, configured to conceal the reservoir.

5. The safety detection system of claim 1, including an electrical input, the electrical input configured to provide power to both the smoke detection device and the light fixture.

6. The safety detection system of claim 5, wherein the electrical input is a switched electrical input, configured to enable the light fixture to be turned on and off.

7. The safety detection system of claim 6, further including a battery configured to power the smoke detection device when the light fixture is switched off.

8. The safety detection system of claim 1, including a switched electrical input configured to power the light fixture, and non switched electrical input configured to power the smoke detection device.

9. The safety detection system of claim 1, wherein the light fixture includes a light that is configured to operate in a signalling configuration when smoke is detected by the smoke detection device.

10. The safety detection system of claim 1, including a second light fixture, the second light fixture including a light that is configured to operate in a signalling configuration when smoke is detected by the smoke detection device.

11. The safety detection system of claim 10, wherein the light fixture and the second light fixture are wirelessly coupled.

12. The safety detection system of claim 1, the light fixture including a light configured to illuminate in the event of an alert situation, wherein the light indicates the type or nature of the alert via hue or light activation sequencing.

13. The safety detection system of claim 1, wherein the light fixture includes an illumination component, wherein a hue of the light fixture is variable to signify operating status or alert status information.

14. The safety detection system of claim 1, wherein the light fixture is installed during construction of the building, and is connected to mains power within the building.

15. The safety detection system of claim 1, wherein the smoke detection device includes a communication module, configured to enable the detection device to communicate with remote devices.

16. The safety detection system of claim 1, configured to communicate status and alert information to one or more remote devices.

17. The safety detection system of claim 3, wherein the apertures are provided around a periphery of the light fixture.

18. The safety detection system of claim 1, wherein the reservoir is cylindrical or frustoconical in shape.

19. The safety detection system of claim 1, wherein the reservoir is configured to releasably engage with the fixture.

* * * * *